United States Patent
Esteve Balducci et al.

(10) Patent No.: US 10,362,174 B2
(45) Date of Patent: *Jul. 23, 2019

(54) MESSAGE FORWARDING AND RETRIEVAL WITH A SINGLE MESSAGING SERVICE

(71) Applicant: Microsoft Technology Licensing, LLC, Redmond, WA (US)

(72) Inventors: Juan V. Esteve Balducci, Sammamish, WA (US); Michael Higashi, Issaquah, WA (US); Selvaraj Nalliah, Redmond, WA (US); David Paul Limont, Seattle, WA (US); John Allen Atwood, Duvall, WA (US); Chris J. Hinman, Everett, WA (US); Imran Masud, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,159

(22) Filed: May 29, 2018

(65) Prior Publication Data

US 2018/0278752 A1    Sep. 27, 2018

Related U.S. Application Data

(63) Continuation of application No. 15/404,819, filed on Jan. 12, 2017, now Pat. No. 9,986,100, which is a (Continued)

(51) Int. Cl.
*H04L 12/58* (2006.01)
*H04M 3/533* (2006.01)
(Continued)

(52) U.S. Cl.
CPC .............. *H04M 3/533* (2013.01); *H04M 3/44* (2013.01); *H04M 11/10* (2013.01); *H04W 4/12* (2013.01); *H04M 2203/4509* (2013.01)

(58) Field of Classification Search
CPC .. G07B 15/02; G07B 15/063; G06Q 30/0258; G06Q 30/0266; H04M 3/533;
(Continued)

(56) References Cited

U.S. PATENT DOCUMENTS

| | | | |
|---|---|---|---|
| 6,498,930 B1* | 12/2002 | Mamaghani | H04W 8/183 455/413 |
| 2010/0167699 A1* | 7/2010 | Sigmund | H04M 3/02 455/413 |

* cited by examiner

*Primary Examiner* — Phuoc H Doan

(57) ABSTRACT

Embodiments described herein generally relate to a method and system of integrating a user's voice mail onto a single voice messaging service, e.g., a Unified Messaging (UM) service, such that a client may access this single source for voice mail retrieval, even where such voice mails are from a variety of sources, e.g., work, mobile phone, etc. A user, or the user's mobile operator, need only agree to accept the service, and the registration and configuration requirements for providing the service and forwarding calls to the service are automatically configured. The user's existing "speed dial" key or other setting for retrieving voice mail may also be automatically configured to the access number(s) for the service. Configurations may monitor the status of the service and update access and/or forwarding numbers. Voice mail forwarding and settings may also be automatically reverted back to the user's original service.

20 Claims, 6 Drawing Sheets

Related U.S. Application Data continuation of application No. 14/467,906, filed on Aug. 25, 2014, now Pat. No. 9,578,176, which is a continuation of application No. 13/615,022, filed on Sep. 13, 2012, now Pat. No. 8,855,607, which is a continuation of application No. 12/335,362, filed on Dec. 15, 2008, now Pat. No. 8,295,814.

(51) Int. Cl.
*H04M 3/44* (2006.01)
*H04M 11/10* (2006.01)
*H04W 4/12* (2009.01)

(58) Field of Classification Search
CPC .......... H04M 3/44; H04M 2203/4509; H04W 12/06; H04W 8/28
USPC ....... 455/413, 415; 379/142.04, 88.18, 88.12
See application file for complete search history.

MESSAGE FORWARDING AND RETRIEVAL WITH A SINGLE MESSAGING SERVICE

CROSS-REFERENCE TO RELATED APPLICATIONS

This application is a continuation application of U.S. patent application Ser. No. 15/404,819 (now U.S. Pat. No. 9,986,100), entitled "MESSAGE FORWARDING AND RETRIEVAL WITH A SINGLE MESSAGING SERVICE," filed on Jan. 12, 2017, which application is a continuation application of U.S. patent application Ser. No. 14/467,906 (now U.S. Pat. No. 9,578,176), filed on Aug. 25, 2014, which application is a continuation application of U.S. patent application Ser. No. 13/615,022 (now U.S. Pat. No. 8,855,607), filed on Sep. 13, 2012, which application is a continuation application of U.S. patent application Ser. No. 12/335,362 (now U.S. Pat. No. 8,295,814), filed Dec. 15, 2008, the entire disclosures of which are hereby incorporated herein by reference.

BACKGROUND

Voice messaging has become an integral part of businesses' and individuals' daily lives. Indeed, many consumers have access to a multitude of voice messaging systems. For example, a consumer may have voice messaging provided by their employer, their own personal mobile operator, their home landline, etc. These voice messaging systems often provide different features and different types of overall experiences for the user. For example, some voice messaging systems now provide a combination of communications, i.e., unified communications, to the user, such as voice mails and electronic mail (e-mail). Some systems provide text transcripts of voice mail messages stored in the voice messaging system. The disparate features offered by the various voice messaging systems requires a user to develop a familiarity and knowledge of each such system to provide efficiency in the use of such systems. However, even such familiarity and knowledge does not diminish the need for users to spend time checking a variety of sources when they desire to stay up-to-date with their voice messages. Checking a multitude of sources is time-consuming and also leaves room for error where the user may forget to check a particular source.

Further, having a multitude of disparate voice messaging services is inefficient for a user in the registration and configuration process because these processes require manual manipulation. To register with a voice messaging service, the user provides identification information and any other information required by the particular voice messaging service. The user then is required to manually provide the number(s) to which unanswered, busy, or unavailable calls should be forwarded. Different phone numbers for forwarding may be required for each type of call. For example, standard Global System for Mobile communications (GSM) networks require users to forward "busy" calls by dialing *67*[Phone Number]#, *61*[Phone Number]# for "unanswered" calls, and *62*[Phone Number]# for calls when the phone is "unavailable," or not in reach of the carrier network. Not only does such manual forwarding consume user time and require knowledge of such requirements on the part of the user, but the problem is exacerbated given that not all mobile operators follow the same standards for such manual forwarding. For example, a single phone number for forwarding may be used by some mobile operators. The problem is further exacerbated when access numbers for retrieving such messages change based on changes made at the voice messaging service or if the user changes physical locations and desires to connect to a voice messaging service that does not require a long-distance phone call, for example. The ability of users to respond to such changes and manually register and forward their calls thus becomes increasingly difficult to accomplish in a timely manner and is subject to rampant errors.

Although specific problems have been addressed in this Background, this disclosure is not intended in any way to be limited to solving those specific problems.

SUMMARY

Embodiments generally relate to integrating voice mail onto a single voice messaging service, such as a Unified Messaging (UM) service, such that a client may access the single UM service for retrieval of the user's voice messages, even where such voice messages come from a variety of sources, e.g., work, personal mobile phone, etc. Automatic configuration logic enables the registration of the user's identification information with the voice messaging service and the forwarding of calls to the voice messaging service to occur automatically, without the need for manual intervention or manipulation by the user. A user or the user's mobile operator need only "agree" to accept the service provided by the particular voice messaging system, and the registration and configuration requirements for providing such a service are then automatically set up. A user may thus take advantage of the features of a preferred voice messaging system, or, at the very least, aggregate his/her voice messages into a single service for ease of retrieval without the need for manual set-up of such capabilities. In another embodiment, automatic configuration logic also enables the automatic setting, or programming, of the user's existing "speed dial" key, or other key or button programmed for connecting to voice mail, on the user's phone to the access number for the selected UM service. The user can thus access his/her voice mail messages at the single UM service with the same speed dial key he/she has previously used for accessing such messages from the mobile operator network or local database. The user can therefore use his/her existing speed dial key or other button or feature for message retrieval as if the user's messages were stored by the mobile operator's, or mobile carrier's, voice mail service. The features and capabilities, or at the very least aggregated capabilities, of the selected UM server are thus available to the user with ease of access and without any interaction or manipulation on the user's part other than acceptance of the service or acceptance of a service contract from a mobile operator network providing for such service. A further embodiment provides for the system to monitor the configuration and to update it automatically in response to any changes, such as, for example, changes to access phone numbers or the availability of additional new phone numbers. Further yet, an embodiment relates to reverting the forwarding of the voice messages and of the settings back to the mobile operator's server, or other server, where changed conditions or desires require such rollback.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numbers refer to like items.

DETAILED DESCRIPTION

Figure 1:
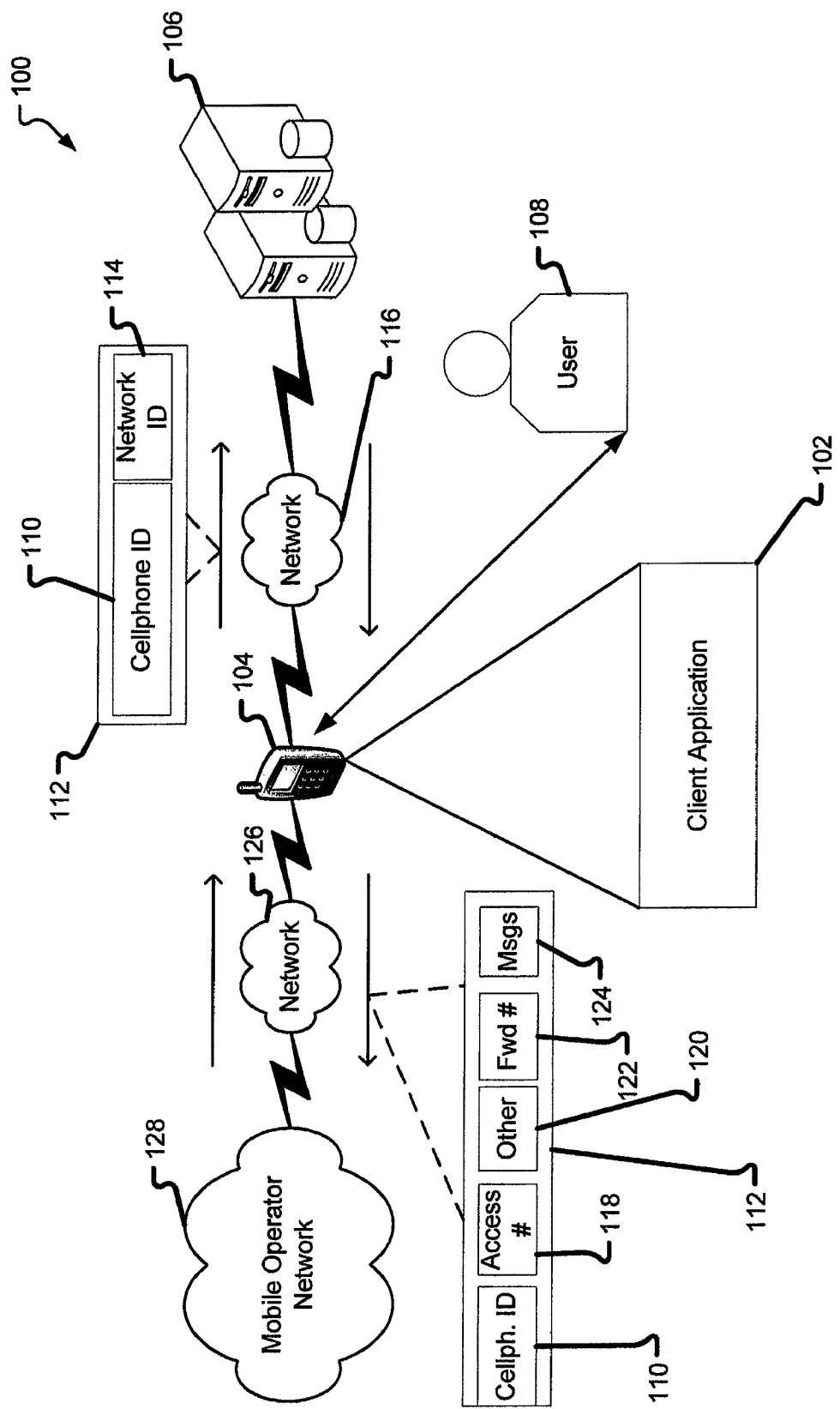
FIG. 1 illustrates an exemplary logical representation of an environment for communicating voice mail messages to a UM service through automatic registration and configuration capabilities in accordance with an embodiment of the present disclosure.

This disclosure will now more fully describe exemplary embodiments with reference to the accompanying drawings, in which specific embodiments are shown. Other aspects may, however, be embodied in many different forms and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments of the present disclosure generally relate to automatically configuring a user's voice mail messaging capabilities such that the user's phone, e.g., mobile device, may communicate with a server capable of receiving voice mails, e.g., a UM server. While this description may refer to a UM server, any type of server offering such capabilities may be used. A "UM" server is offered by way of example only. This automatic configuration provides the ability for the user to register with the voice messaging service and to have the user's phone calls forwarded to the voice messaging server automatically. This two-part automatic process occurs simply by the user "accepting" the service provided by the UM server. In an embodiment, the user may "accept" the service by answering positively to a prompt asking the user if he/she would like to use the UM server for voice messaging. In another embodiment, the user may "accept" the service by agreeing to an overall plan with the user's mobile operator that provides such a service as part of its overall service plan.

By accepting the service, the UM server and the mobile device communicate with each other such as to automatically obtain registration information for obtaining the service and an access phone number that designates the user's unique voice mail box. The mobile device communicates with the UM server through the use of a client application on the mobile device. In providing its unique registration information, the client application provides its phone number to the server so the server knows which mailbox to use for this particular client application and user. The server then sets such number and registers the user/client application if such number is available. Next, the server responds with an access number for the voice mail based on the received phone number and prefix matching. The server also responds with the number to which to forward calls based on such prefix matching. Any type of phone call known to or understood by those of ordinary skill in the art may be forwarded to the server in accordance with embodiments of the present disclosure. For example, "busy" calls, or ones in which the line is "busy" as detected by an engaged tone, may be forwarded. As another example, "unanswered" calls may be forwarded, or, in another embodiment, "unavailable" calls may be forwarded. A call is "unavailable" when a mobile phone user is out of the network or otherwise unable to obtain service from the user's network provider.

In providing access and/or forwarding numbers, an embodiment, as noted, provides for the server to use logic to provide an access and/or forwarding number that matches the details, e.g., through prefix matching, of the mobile device's conditions. For example, in an embodiment, the server may match the area code, the country code, etc. If the user provides an international number, another embodiment may provide for the service to provide a forwarding number to another country designated code that is available if an international number is not possible.

Upon receiving the voice mail forwarding number, the client application sets up the forwarding of designated calls to the received number with the client's mobile operator. The client application uses logic to accomplish such configuration with the mobile operator so that the calls received by the client application are forwarded to the selected UM server. The user is not involved in such a configuration process. Rather, programmed logic at the client application provides the necessary processing and communications for accomplishing this configuration automatically.

In another embodiment, communications between the client application and the UM server enable the client application to ensure that it is using the most appropriate, or best, access number based on the client application's area code, country code, etc., e.g., through continual or periodic prefix matching. If any changes occur at the voice mail server, for example, the server will forward a new access number and forwarding number to the client application. In another embodiment, changes at the client application may prompt the server to provide a different access number and/or forwarding number. For example, if the user changes countries, the UM server may provide international access and forwarding numbers to the client application. In another embodiment, an access number is sent to client application without requiring it to be the most appropriate or "best" access number, e.g., providing an "available" number.

Thus, a further embodiment provides for the system to monitor the configuration and to update it automatically in response to any changes, such as, for example, changes to access phone numbers or the availability of additional new phone numbers.

In another embodiment, the automatic configuration logic at the client application also enables the automatic setting of the user's existing programmed "speed dial" key, or other key or button programmed for connecting to voice mail, on the user's phone to the access number for the selected voice messaging service. For example, a user may have programmed the "1" key to act as a "speed dial" key to retrieve voice mail if it is held down for a specified period of time. In another embodiment, the client application may provide a certain key or button to access voice mail. In yet another embodiment, the mobile device may require the user to access a menu or series of menus to obtain a selection for retrieving voice mail. The user may access the voice mail selection on the specific menu by viewing the mobile device's user interface and using "arrow" or other keys or buttons to maneuver through the various menus or menu options. Any number of types of voice mail access buttons, keys, menus, or menu options as known to or understood by those of ordinary skill in the art may be automatically configured to retrieve voice mail at the selected voice messaging service, or UM server, in accordance with embodiments of the present disclosure. As noted, while a UM server is described in embodiments herein, any type of voice messaging service or server(s) as reasonably known to or understood by those of ordinary skill in the art may be used in accordance with embodiments disclosed herein. For example, the voice messaging service, or message server, may be a MICROSOFT® Exchange Server or any other type of message server known in the art by those of ordinary skill. While a UM server and MICROSOFT® Exchange Server are described, these are offered for purposes of illustration only. Any number of types of servers as known to or understood by those of ordinary skill in the art may be used without departing from the spirit and scope of the embodiments disclosed herein.

In a further embodiment, where the UM server provides a changed access and/or forwarding number to the client application, the client application is configured to automatically handle such new number(s), such as by re-configuring the speed dial or other voice mail access keys to reflect the new access number.

Where a client application has configured a mobile device to forward and access a particular voice mail server for voice messaging over the mobile device operator's voice messaging source, for example, embodiments relate to automatically providing for the "rollback" of such forwarding to the original voice messaging source upon the termination or disabling of the service. For example, if a user changes his/her place of employment and does not have access to the selected UM server, the server may inform the client application that it is no longer available. The client application is then configured to automatically revert to the original source for voice mail forwarding and storage. For example, busy, unanswered, and/or unavailable phone calls may return to being forwarded to the mobile operator network's server, or server farm, for receipt, storage, and download at the client application from the server upon demand, e.g, upon request of the user. In another embodiment, the voice mail messages may be stored locally at the mobile device system. Such reverting to the original source may occur for any number of reasons. By way of example only, a user may not pay his/her invoice for a particular UM service and such service may then be interrupted or terminated. Alternatively, the UM server may be disabled or the user may simply decide that he/she does not prefer the UM server features or may desire to have separate voice messaging systems for privacy or security concerns.

An exemplary environment 100 for integrating voice mail onto a single UM service by using logic at the UM server and the client application to automatically configure the provisioning of such service, the forwarding of voice mails, and the retrieval of voice mail messages on the mobile device is shown in FIG. 1 in accordance with an embodiment disclosed herein. In a particular embodiment, client application 102 on mobile device 104 communicates with a server, e.g., UM server, or server farm 106. Server 106 is capable of receiving voice mails. Server 106 is also capable of providing a phone number(s) to forward voice mails for the particular mobile device user 108. Server 106 is also capable of providing a phone number(s) to access voice mail messages stored at server 106.

Client application 102 provides identification and registration information for provisioning the user's account for use of the voice messaging service, e.g., registering the user for such services, through transmittal of a data packet 112 to server 106 across network 116. This data packet 112 includes, in an embodiment, the mobile device identification number 110 and mobile operator network identification number 114. Any type of information necessary or desired for provisioning the service as known to or understood by those of ordinary skill in the art may be included in data packet 112 in accordance with embodiments disclosed herein. Such provisioning enables the server 106 to provide a voice mailbox that is unique for user 108. In another embodiment, data packet 112 also includes voice mails (not shown). Upon registering user 108 and corresponding client application 102, server 106 transmits data packet 112 to client application 102 across network 116 (shown as also transmitting across network 126). In an embodiment, data packet 112 comprises mobile device identification number 110, a phone number(s) for forwarding 122 voice mails 124 to server 106, and a phone number(s) for accessing voice mails 118 forwarded thereto and stored thereon. Thus, in an embodiment, data packet 112 comprises voice mail messages 124 stored on server 106 and retrieved by client application 102 for downloading onto mobile device 104. Data packet 112 may also contain other data, as known to or understood by those of ordinary skill in the art in accordance with embodiments disclosed herein, and as shown by "Other" 120.

Upon receiving the access and forwarding numbers in data packet 112 from server 106, client application 102 communicates with mobile operator network 128 over mobile network 126. Mobile operator network 128 may have its own proprietary voice mail system (not shown). However, in exemplary logical environment 100, user 108 has selected server 106 to provide voice mail service to mobile device 104 and client application 102.

It is worth noting at the outset that FIG. 1 is merely an example of an environment for practicing the present disclosure. For example, FIG. 1 shows UM server 106, or UM server farm 106. However, embodiments also cover any type of server, separate servers, server farm, or other voice messaging system or systems, for providing voice messaging services. Further yet, FIG. 1 shows mobile device 104. However, any type of small computer device, including any phone having data access, may be used as is reasonably known to or understood by those of ordinary skill in the art without departing from the spirit and scope of the embodiments disclosed herein. Indeed, mobile operator network 128, mobile device 104, client application 102, user 108, and UM server 106 are valid ways of practicing embodiments disclosed herein but are in no way intended to limit the scope of the disclosure herein. Further, the exemplary network environment 100 may be considered in terms of the specific components described, e.g., server, mobile device computing system, etc., or, alternatively, may be considered in terms of the analogous modules corresponding to such units.

Although only one mobile device 104 and client application 102 are shown, for example, another embodiment provides for multiple small computer devices to communicate with UM server 106. In an embodiment, each small computer device communicates with the same mobile operator network 128, or, in other embodiments, multiple and separate mobile operator networks communicate with the small computer devices. In yet another embodiment, each small computer device communicates with a separate mobile operator network. Logical environment 100 is not limited to any particular implementation and instead embodies any computing environment upon which the functionality of the environment described herein may be practiced. Further, network 116, although shown as a single network may be any type of network conventionally known to or understood by those of ordinary skill in the art. In accordance with an exemplary embodiment, the network may be the global network (e.g., the Internet or World Wide Web, i.e., "Web" for short). It may also be a local area network, e.g., intranet, or a wide area network. In accordance with embodiments of the present disclosure, communications over networks 116 occur according to one or more standard packet-based formats, e.g., H.323, IP, Ethernet, and/or ATM. Further, mobile network 126 may use any kind of format reasonably known to or understood by those of ordinary skill in the art. Thus, any conceivable environment or system may be understood by those of ordinary skill in the art in accordance with embodiments disclosed herein. FIG. 1 is offered as an example only for purposes of understanding the teachings of the present disclosure and is in no way intended to be limiting.

Figure 2:
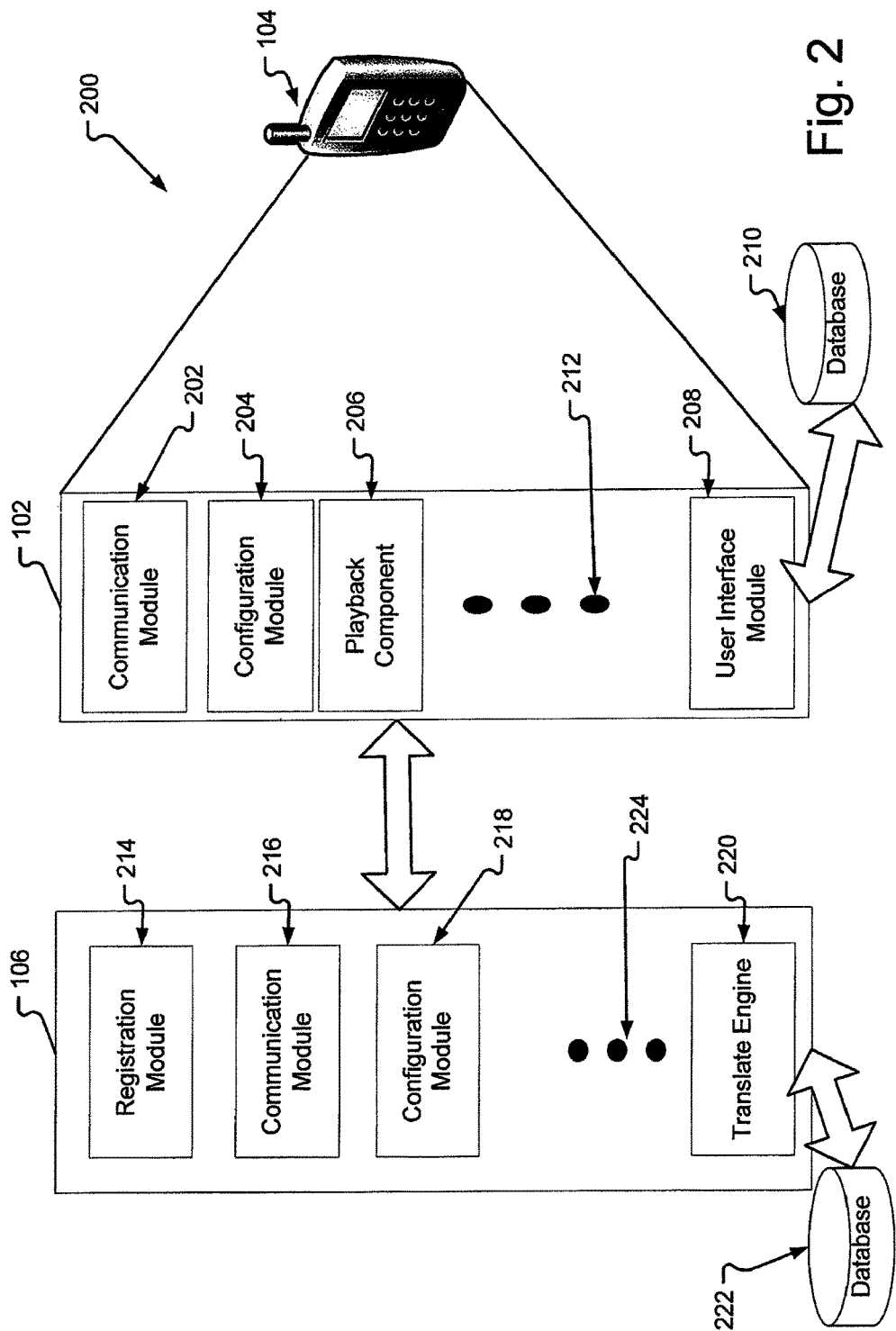
FIG. 2 depicts a logical representation of exemplary functional component modules for the client application residing on the mobile phone and UM servers depicted in FIG. 1 for providing automatic configuration capabilities for the forwarding and accessing of voice mail messages in accordance with an embodiment of the present disclosure.

While FIG. 1 shows mobile device 104 and UM server 106, FIG. 2 shows the software functional modules and storage means in logical environment 200 corresponding to such computing units for automatically configuring registration, forwarding of calls, and speed dial capabilities in accordance with embodiments disclosed herein. In exemplary embodiments, client application 102 on mobile device 104 includes a communication module 202 for communicating with server 106 for provisioning the account of mobile device 104 and user 108 for obtaining voice messaging services from UM server 106. Communication module 202 both receives and transmits information and data packets to server 106. For example, communication module 202 sends identification information for mobile device 104, such as mobile device 104's phone number, and voice mails. Configuration module 204 allows client application 102 to receive and send data to server 106 regarding the appropriate access and forwarding phone numbers for voice mails to be serviced by server 106. In an embodiment, configuration module 204 also allows client application 102 to receive and send data to mobile operator network 128 regarding the access number(s) and forwarding phone number(s) received from server 106 when user 108 has selected server 106 for providing its voice messaging services. In another embodiment, configuration module 204 enables client application 102 to receive and transmit data to mobile operator network 128 for automatically configuring "speed dial" key(s), button(s), menu(s), or menu option(s) on mobile device 104 for retrieving voice mails from server 106, e.g., requesting voice mails in the voice mailbox identified for user 108 to be downloaded from server 106 to mobile device 104. Playback component 206 provides for such voice mails to be played back to user 108 using output device(s) on mobile device 104. In another embodiment, user 108 views text messages translated from server 106 of voice mails on a user interface on mobile device 104 through the use of user interface module 208. In yet other embodiments, user interface module 208 enables user 108 to select voice mail retrieval, accept voice mail service by server 106, etc.

Identification information and other data for provisioning mobile device 104 for receiving voice messaging services from server 106 is stored on exemplary database 210 in accordance with an embodiment as disclosed herein. In embodiments, database 210 stores any type of data for executing the client application. For example, database 210 may store data for communicating with mobile operator network 128. In another embodiment, database 210 stores data necessary for configuring mobile device 104 to process the access phone number(s) and forwarding phone number(s) received from server 106 and to program user 108's speed dial key or other feature to retrieve voice mails using such access phone number(s). Other or additional modules and/or components as known to or understood by those of ordinary skill in the art may be included, as designated by ellipses 212.

In communicating with mobile device 104, server 106 includes registration module 214 for processing the identification information and data provided by user 108 and client application 102 for provisioning an account for user 108 for storing user 108's voice mails in a unique mailbox. Registration module 214 receives this data and information from user 108 through the use of communication module 216 in accordance with an embodiment disclosed herein. Communication module 216 receives and transmits information and data packets to and from mobile device 104. For example, in an embodiment, communication module 216 transmits access and forwarding phone numbers to client application 102.

In determining the access and forwarding phone numbers to send to client application 102 based on the identification information provided for user 108, server 106 employs configuration module 218 to determine the appropriate access and forwarding numbers based on client application 102's area code, country code, etc. In an embodiment, configuration module 218 thus uses identification information provided at registration module 214 and programmed logic to determine these access and forwarding numbers such that user 108's voice mails are sent and stored at a voice mailbox unique to user 108. According to an embodiment, configuration module 218 stores and retrieves access and forwarding numbers from database 222. In embodiments, configuration module 218 configures server 106 in how to communicate with mobile device 104.

In a particular embodiment, server 106 includes translation engine 220 to translate messages sent to client application 102 to a certain format. For example, in one aspect of an embodiment, translation engine 220 receives a recorded voice mail message and translates it into a data file including text to send to client application 102 as a visually viewable message to be read through user interface module 208 at mobile device 106. In another example aspect, translation engine 220 changes the format of an email message from rich text format to XML, for example, before sending it to client application 102. Any number of types of translations may occur as known to or understood by those of ordinary skill in the art in accordance with embodiments of the present disclosure. Further, other or additional modules and/or components as known to or understood by those of ordinary skill in the art may be included, as designated by ellipses 224. While any means of storage or memory may be used as known to or understood by those of ordinary skill in the art, databases 210 and 222 are shown as exemplary storage means.

While FIG. 2 shows specific modules, module names, and storage means, these modules and storage means are offered for purposes of illustration. As noted, any number of types of modules and storage means as reasonably known to or understood by those of ordinary skill in the art may be included. Further, not all modules and/or storage means as depicted in FIG. 2 need be used in accordance with embodiments of the present disclosure. Rather, fewer modules may be used in accordance with embodiments disclosed herein. Further yet, additional modules and/or storage means may be used in accordance with other embodiments. Thus, FIG. 2 is intended in no way to be limiting to those modules, module names, and storage means shown. Any number of types of modules, components, storage means, etc. may be used as reasonably known to or understood by those of ordinary skill in the art in accordance with embodiments disclosed herein.

Figure 3:
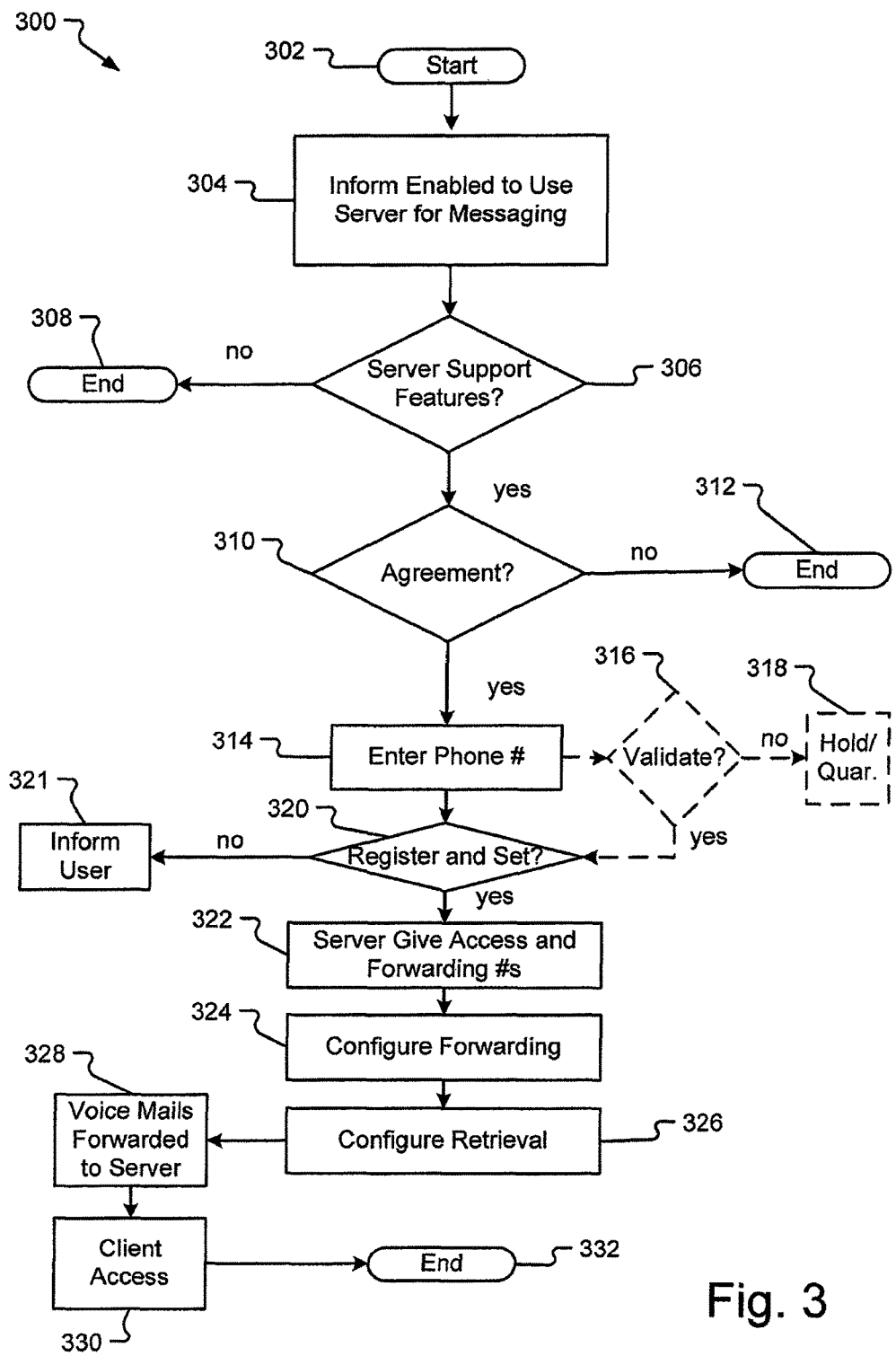
FIG. 3 depicts an exemplary flow diagram illustrating the operational characteristics of a process for setting up such provisioning and forwarding of voice mail messages and configuration capabilities as shown in the logical representation in FIG. 1 in accordance with an embodiment of the present disclosure.

While FIG. 2 shows the functional software components for using the logic on client application 102 and server 106 to automatically configure, send, and receive access and forwarding numbers in accordance with embodiments, FIG. 3 depicts the operational steps 300 for automatically configuring, sending, and receiving access and forwarding numbers between client application 102 and server 106 in accordance with embodiments disclosed herein. Start operation 302 is initiated and process 300 proceeds to inform operation 304 in which client application 102 begins communications with server 106, informing server 106 that it is capable of having server 106 handle its voice messaging for it and is capable of configuring itself to enable such service, according to an embodiment disclosed herein. Client application 102 thus informs server 106 that it is enabled for such a forwarding service. In embodiments, the determination of whether the user is enabled or not for such forwarding to the particular or enhanced voice messaging service is determined by consulting a locally stored flag(s) indicating whether such forwarding is possible for the user. A "flag" is offered here by way of example only. Any type of mechanism for tracking the user's enablement and capabilities as known to or understood by those of ordinary skill in the art may be used. Query operation 306 prompts server 106 to determine if it is able to support this service. If NO, flow branches NO to end operation 308 and process 300 terminates such that client application 102 is not able to select server 106 to handle its voice messaging service. If server 106 supports this service, flow branches YES to user agreement query 310 in which it is determined whether user 108 accepts this service. In an embodiment, user 108 accepts this service by responding affirmatively to a prompt at his/her user interface on mobile device 104 through user interface module 208. In another embodiment, user 108 "accepts" this service by agreeing to an overall service contract with his/her mobile operator that covers this service in the broad umbrella of services it provides to user 108 in a contract for such services, for example. If acceptance is not indicated, flow branches NO to end operation 312 and process 300 terminates at end operation 312. For example, user 108 may desire to have a server handle its voice messaging service other than a server or servers at the mobile operator network 128. However, user 108 may not be paying the required fees to have the UM server provide such a service. In such an embodiment, acceptance would not occur and process 300 terminates at end operation 312. On the other hand, if acceptance is indicated, flow branches YES to send client phone number operation 314 in which the client enters and transmits its phone number, e.g., mobile device phone number, to server 106. In an embodiment, the client also sends other identification information for registering, or provisioning an account, for a unique voice mailbox for user 108 with server 106.

In optional query step 316, server 106 may query the client to verify if the phone number and/or other identification information received matches the identity of client 102. In other words, server 106 asks client 102 to validate that the client is the rightful owner of the phone number given according to embodiments disclosed herein. This security query to validate ownership of the received phone number may prevent an individual or entity from fraudulently using incorrect phone numbers to block others from obtaining service for their rightful phone numbers. Query 316 may involve a single security question in accordance with an aspect of an embodiment or multiple security questions in accordance with another aspect. If client application 102 fails to answer the security query correctly, process 300 branches NO to hold/quarantine operation 318, in which the client is placed in a quarantine state until it answers other security questions, for example, correctly in accordance with an embodiment. In another embodiment, query step 316 does not validate ownership of the phone number received but, instead, queries if the user identified has exceeded a defined limit of phone numbers for registration with server 106. Yet another embodiment provides for such validation through the use of SMS message(s) and shared secrets, while another embodiment provides for using a callback mechanism with or without shared secrets to verify the phone number. In an embodiment, the voice messaging service handles such security/validation queries. In another embodiment, a separate or multiple separate end points different from the service could implement such a security check. If client application 102 answers correctly to security query 316, process 300 branches YES to register and set query 320, in which the number is set at server 106 and client 102 is registered if the number given is available and other identification information is provided, if required.

As noted, process 300 may proceed to register and set query 320 directly in response to receiving the client phone number in operation 314 given that operations 316 and 318 are optional steps. If the server may not set the given number or otherwise register user 108, process 300 proceeds NO to inform operation 321, in which user 108 is informed that the registration process has failed. If the registration and setting of the number is successful, process 300 proceeds next to operation 322, in which server 106 responds with access and forwarding phone numbers 322. At operation 322, server 106 sends an access phone number(s) and forwarding number(s) to client application 102 so that client application 102 can work with the mobile operator in configure operation 324 to configure, or set up, the forwarding of particular phone call types, e.g., unanswered, busy, unavailable, to the service in accordance with an embodiment disclosed. Continuing to configure retrieval operation 326, client application 102 configures the retrieval of voice mails from the voice messaging service with the received access phone number. In an embodiment, this configuration includes configuring the existing speed dial key(s), or other key(s), button(s), menu(s), or menu option(s), to use such access phone number.

Having configured the set-up of the service for client application 102, process 300 flows to operation 328 where voice mails received for client application 102 are forwarded to server 106. Next, client application 102 accesses these voice mails 330 using the programmed access phone number and/or speed dial key, button, menu, or menu options for retrieving voice mail in accordance with embodiments disclosed herein. Process 300 then terminates at end operation 332.

It should be noted that process 300 accomplishes the configuration for using the voice messaging service for user 108's voice mails and setting up of such features, such as modifying the existing speed dial key to retrieve voice mails from the service, for example, without any user interaction other than the user's acceptance, or implied acceptance, to receive such service at operation 310. The configuration steps automatically occur following this acceptance. As with FIG. 1, FIG. 3 is merely an example of possible operational characteristics for the automatic configuration process in accordance with embodiments disclosed herein. Operational steps depicted may be combined into other steps, or additional steps may be added, for example, without departing from the spirit and scope of the embodiments disclosed herein. For example, additional steps may be added to inform the user of errors, such as where forwarding of voice mails is not configured properly or where the server is disabled, according to embodiments. In an embodiment, a pop-up dialogue or other user interface feature may inform the user that the number given to the server cannot be registered, for example. In an aspect of an embodiment, the user may be prompted to enter another phone number and/or, in another aspect, may be informed of the error.

Figure 4:
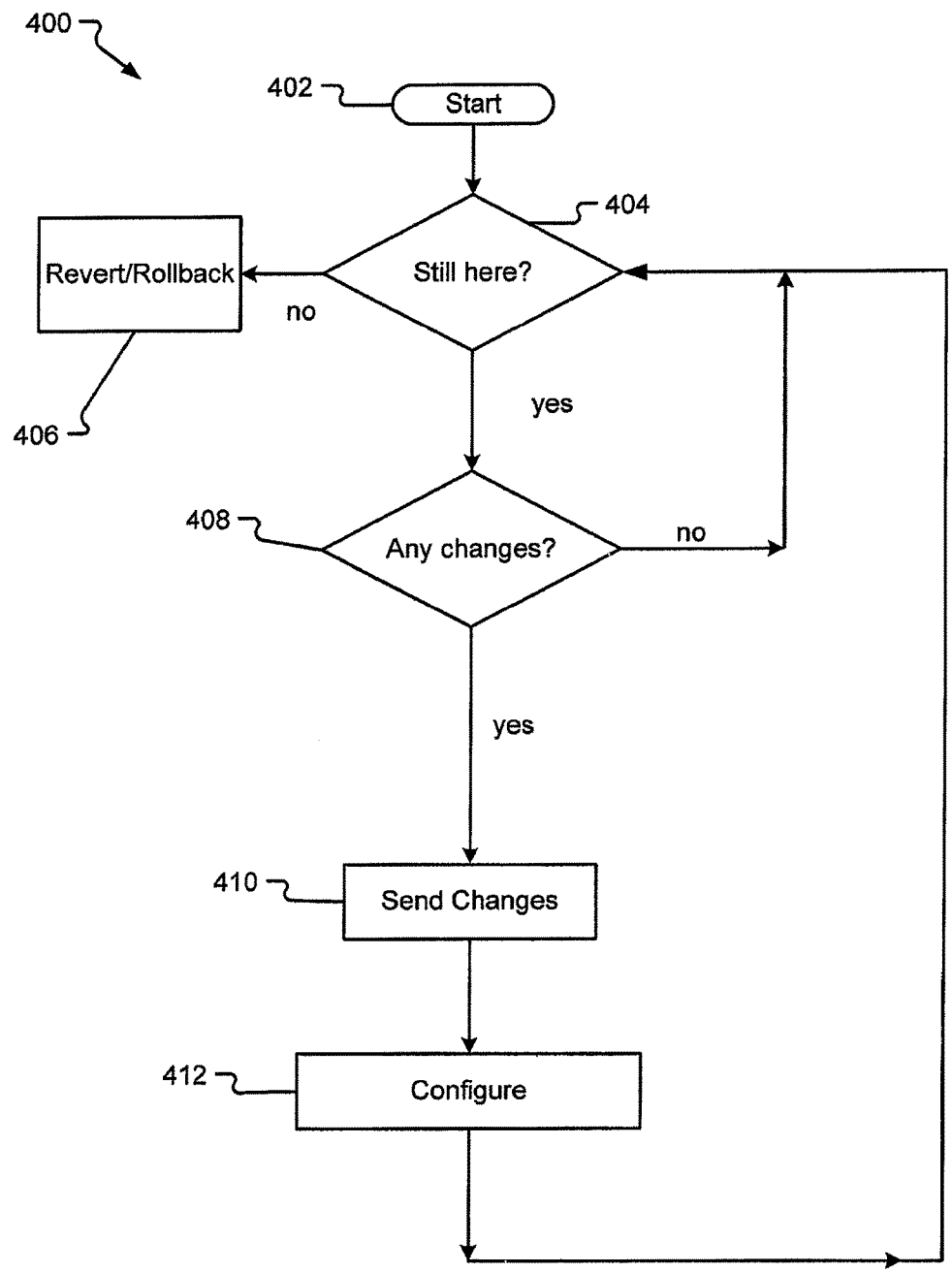
FIG. 4 illustrates an exemplary flow diagram illustrating the operational characteristics of a process for reverting the forwarding of voice mail messages from the UM server(s) to the mobile operator or carrier depicted in FIG. 1 in accordance with an embodiment of the present disclosure.

Turning to FIG. 4, process 400 depicts the operational steps for monitoring and updating access and/or phone numbers and reverting back to the user's original source for voice mails in accordance with embodiments disclosed herein. Start operation 402 is initiated and process 400 proceeds to query operation 404 where client application 102 prompts server 106 to determine if server 106 is still handling the voice mail service for client application 102. While operation 404 shows client application 102 prompting the server for a status query, another embodiment does not require client application 102 to initiate such prompting. Instead, server 106 informs client application 102 that the configuration settings and/or access phone numbers and/or forwarding phone numbers, for example, have changed. In such an embodiment, process 400 skips directly to operation 406 if the server is disabled or otherwise not continuing to provide service to client application 102 or, in another embodiment, process 400 skips to operation 410, in which changes at server 106 are sent to client application 102. Process 400 then proceeds from operation 410.

In the embodiment where client application 102 prompts server 106 to determine if it is still handling the voice mail service for client application 102, server 106 responds. If server 106 responds that it is not handling the service and/or that client application 102 is no longer allowed to obtain such service, for example, process 400 branches NO to revert back operation 406, in which the voice mail service is automatically reverted back, or rolled back, to the original service provided by the client's mobile operator. Voice mails are then automatically forwarded back to the mobile operator's voice mail service, and the user's mobile device 104 will automatically revert to the original voice mail settings. In another embodiment, the client application configuration module 204 may be used to instead direct that the mobile operator's voice mails be sent to a service other than the server 106 by entering the other service's voice mail access number(s). Indeed, in accordance with embodiments, the user 108 may direct that voice mails be sent to another service at any time by manually entering the desired service's voice mail access numbers(s). Where a rollback occurs, such a rollback may occur, for example only, where user 108 fails to pay for the service of having his/her voice mails forwarded to server 106. Such reason is offered by way of example only. A person of ordinary skill in the art would understand that there are a number of reasons that the service could be terminated or that the user 108's relationship with the voice messaging service could be ended or changed.

Continuing to process 400, if server 106 responds that it is still providing services to client application 102, process 400 branches YES to step 408, in which client application 102 may query server 106 to determine if the access and/or forwarding phone numbers have changed in accordance with an embodiment disclosed herein. For example, server 106's pool of phone numbers may increase or decrease over time and thus require client application 102 to change its configurations to adapt to these changes. Thus, in another embodiment, monitor operation 408 determines if any configuration of the service has changed. If the numbers or configuration have not changed, process 400 branches NO to query operation 404 where the client continues to periodically check in with server 106 to verify that it is handling the voice messaging service for client application 102. If configurations or access and/or forwarding phone numbers have changed, process 400 branches YES to send the changes, e.g., new phone number(s), operation 410, in which server 106 responds by sending the new phone number(s) to client application 102. Upon receiving these changes/new phone number(s), client application initiates the automatic configuration 412 discussed above for processing these new phone number(s)/changes. After configuring for the new phone number(s)/changes, process 400 proceeds to query operation 404 where client application 102 periodically queries server 106 to determine if it is still continuing to provide it with voice messaging services. As with the above FIGS., FIG. 4 is merely an example of possible operational characteristics for the automatic configuration and monitoring/update process in accordance with embodiments disclosed herein. Operational steps depicted may be combined into other steps, or additional steps may be added. For example, a pop-up dialogue or other user interface communication or feature may inform the user that the server is disabled and that forwarding of the user's voice mails to the particular server has stopped. Another pop-up or other dialogue may then inform the user that the user's messages and settings are being reverted to those of the mobile operator carrier, in accordance with embodiments.

Figure 5:
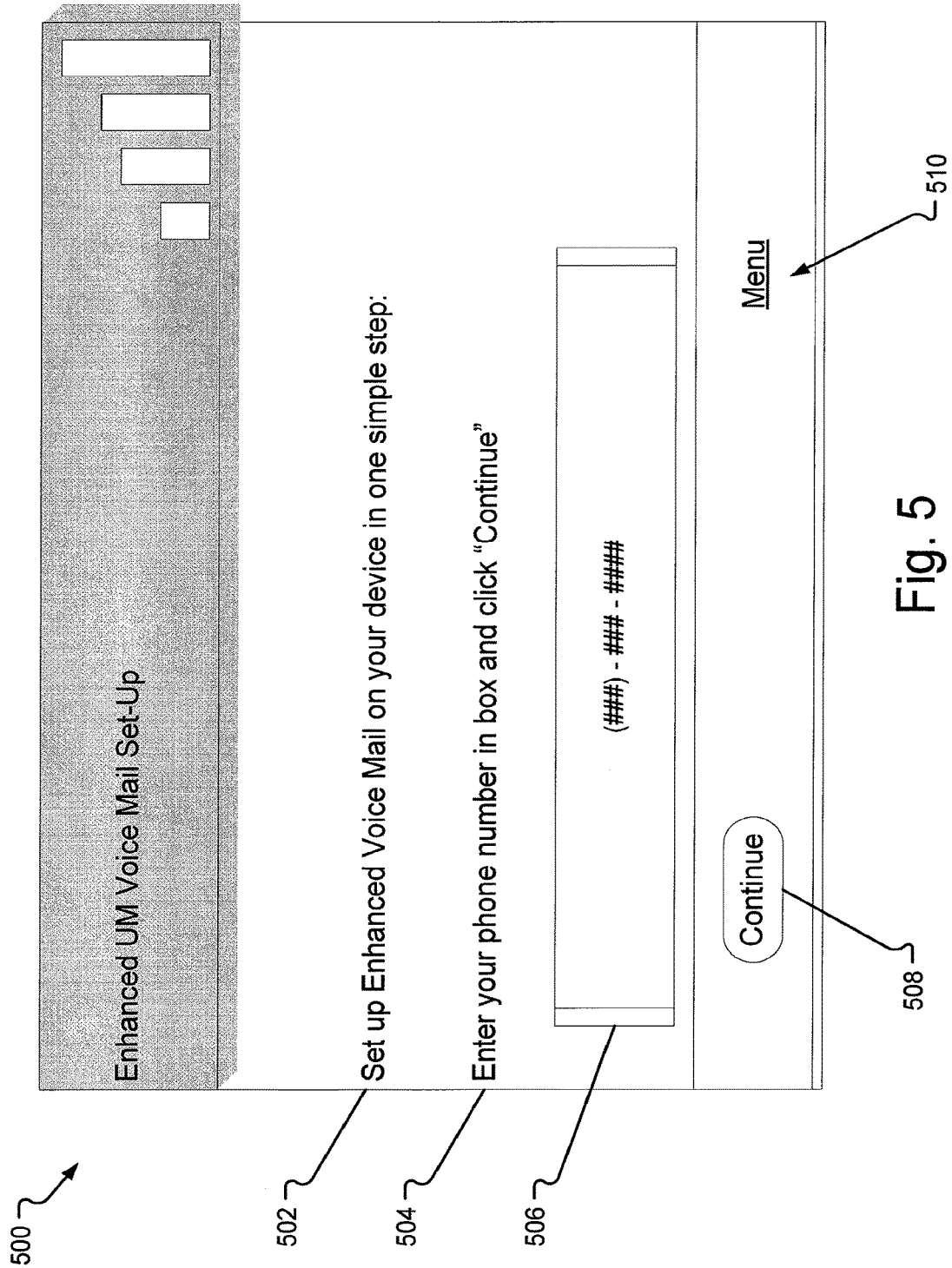
FIG. 5 depicts an exemplary user interface for agreeing to a particular voice messaging service for the forwarding of a user's phone calls in accordance with an embodiment of the present disclosure.

Turning to FIG. 5, an exemplary user interface for agreeing to use an enhanced voice messaging service for the handling of the user's voice mail and the providing of the client's phone number to such service is shown in user interface 500 in accordance with an embodiment disclosed herein. Description 502 shows the user that he/she may set up enhanced voice mail on his/her mobile device in one step. The user is directed to enter or validate his/her phone number 504 in field 506 and to then hit the "Continue" button 508 to start the registration and configuration processes. As noted, in an aspect of an embodiment, the user is directed to validate his/her phone number instead of entering it 504. In such an embodiment, the phone number in box 506 may already be pre-filled in, or automatically populated, by the mobile device, or, in an aspect of an embodiment, by the client application. The user in such an embodiment need only confirm that the number is correct and then proceed to click on the "Continue" button 508 to start the registration and configuration process. In another embodiment (not shown), the user does not see the phone number 506 automatically populated at box 506 but, instead, is simply asked whether he/she desires the enhanced voice mail to be set up. User interface 500 is offered for purposes of illustration only. Any number of type of user interfaces, queries, text boxes, check boxes, etc., as known to or understood by those of ordinary skill in the art may be used in accordance with embodiments disclosed herein.

Returning to FIG. 5, if the user has questions regarding this set-up or service, he/she may select "Menu" 510, in which the user may choose options, such as to learn more about the enhanced voice mail messaging service, to be reminded of this service and set-up later, to decline the service, to notify the mobile device to not ask this set-up question again, etc. Any number of types of options may be included in "Menu" 510 as known to or understood by those of ordinary skill in the art in accordance with embodiments. Further, user interface 500 is an example only of the type of user interface which may be displayed to user 108. Any number of types of user interfaces known to or understood by those of ordinary skill in the art may be used in accordance with embodiments disclosed herein. For example, user interface 500 may instead appear to the user as an abbreviated "pop-up" type dialogue asking the user if he/she would like to forward his/her voice mails to an enhanced voice mail service. A series of pop-up dialogues could then appear on the user's interface, such as to ask the user to enter his/her phone number, etc. In other embodiments, the user does not need to enter his/her phone number because the client application already knows this number and can populate the entry field directly, or may simply send the number to the voice mail messaging service without showing this transmittal to the user. Further yet, no user interface may be used in some embodiments, such as where the user does not need to formally "agree" to the service, but instead may use the service under the general umbrella of the user's contract with his/her mobile operator/carrier.

Figure 6:
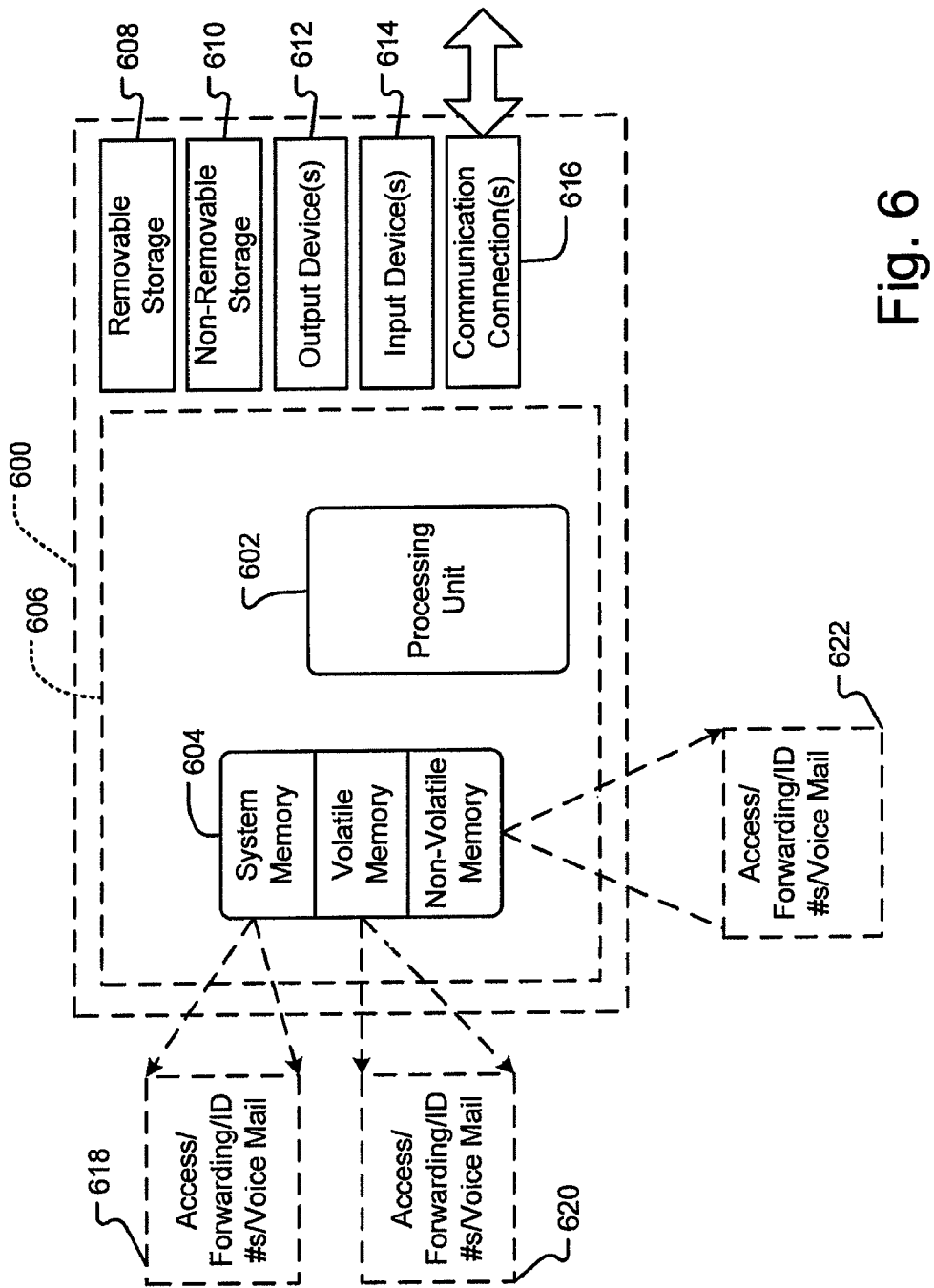
FIG. 6 depicts an exemplary computing system upon which embodiments of the present disclosure may be implemented.

Finally, FIG. 6 illustrates an exemplary computing system 600 upon which embodiments disclosed herein may be implemented. A computer system 600, such as mobile device 104 or server 106, which has at least one processor 602 for automatically configuring the forwarding of voice mails shown in FIG. 1, is depicted in accordance with embodiments disclosed herein. The system 600 has a memory 604, in which a voice mail and/or phone number, such as access or forwarding number, for example, 618 (or 620 or 622) is located. In its most basic configuration, computing system 600 is illustrated in FIG. 6 by dashed line 606. Additionally, system 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the automatic configuration information, for example, and which can be accessed by system 600. Any such computer storage media may be part of system 600. Depending on the configuration and type of computing device, memory 604 may be volatile, non-volatile or some combination of the two. With respect to memory 604, the voice mails, access phone numbers, forwarding phone numbers, and identification/registration information of embodiments disclosed herein could be in system memory 618, volatile memory 620, or non-volatile memory 622 in accordance with embodiments of the present disclosure. The illustration in FIG. 6 is intended in no way to limit the scope of the present disclosure. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System 600 may also contain communications connection(s) 616 that allow the device to communicate with other devices. Additionally, to input content into the fields of the UI on mobile device 104 as provided by UI module 208 in accordance with an embodiment disclosed herein, system 600 may have input device(s) 614 such as a keyboard, mouse, pen, voice input device, touch input device, etc. Output device(s) 612 such as a display, speakers, printer, etc. may also be included, in which such devices may be used to display the UI for viewing voice mail messages, selecting retrieval of voice mail, accepting a prompt to obtain the voice mail services of a particular UM server, etc., in accordance with embodiments of the present disclosure. All of these devices are well known in the art and need not be discussed at length here.

Having described embodiments of the present disclosure with reference to the figures above, it should be appreciated that numerous modifications may be made to the present disclosure that will readily suggest themselves to those skilled in the art and which are encompassed within the scope and spirit of the embodiments disclosed and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple client applications, multiple data packet types, etc. Or, in other embodiments, a single client application with a single server and single mobile operator network are used. One skilled in the art will recognize other embodiments or improvements that are within the scope and spirit of the present disclosure. Therefore, the specific structure, acts, or media are disclosed as exemplary embodiments of implementing the present disclosure. The disclosure is defined by the appended claims.

What is claimed is:

1. A method of automatically redirecting missed phone calls to a first voice messaging service from a single voice messaging service, comprising:
   receiving an indication to revert missed phone calls made to a first phone number to a first voice messaging service, wherein the missed phone calls made to the first phone number are configured to be directed to a single voice messaging service, and wherein the single voice messaging service is configured to handle missed phone calls for at least the first phone number and a second phone number;
   reverting missed phone calls made to the first phone number by automatically redirecting the missed phone calls from the single voice messaging system to the first voice messaging service for retrieval of voice mail messages; and
   automatically reconfiguring an existing speed dial directed to the single voice messaging system to be redirected to the first voice messaging service.

2. The method of claim 1, wherein the single voice messaging service is a Unified Messaging Service.

3. The method of claim 1, wherein automatically reconfiguring the existing speed dial directed to the single voice messaging system comprises reconfiguring the existing speed dial on a user mobile device directed to the single voice messaging system to use to an access phone number received from the first voice messaging service.

4. The method of claim 3, wherein a client application on the user mobile device automatically reconfigures the redirected missed phone calls for retrieval of voice mail messages from the first voice messaging service.

5. The method of claim 4, wherein the automatic reconfiguration occurs between the client application and a mobile operator of the client application.

6. The method of claim 1, wherein the indication to revert missed phone calls made to the first phone number to the first voice messaging service is received from a user.

7. The method of claim 1, wherein the indication to revert missed phone calls made to the first phone number to the first voice messaging service is based on changed conditions.

8. The method of claim 1, wherein the first voice mail service is provided by a mobile operator.

9. The method of claim 1, further comprising:
   automatically reverting to original voice mail settings on a mobile device of the user.

10. A computing system, comprising:
    at least one processor; and
    at least one memory communicatively coupled to the at least one processor and containing computer-readable instructions that, when executed by the at least one processor, cause the computing system to:
    receive an indication to revert missed phone calls made to a first phone number to a first voice messaging service, wherein the missed phone calls made to the first phone number are configured to be directed to a single voice messaging service, and wherein the single voice messaging service is configured to handle missed phone calls for at least the first phone number and a second phone number;
    revert missed phone calls made to the first phone number by automatically redirecting the missed phone calls from the single voice messaging system to the first voice messaging service for retrieval of voice mail messages; and
    automatically reconfigure an existing speed dial directed to the single voice messaging system to be redirected to the first voice messaging service.

11. The computing system of claim 10, wherein the single voice messaging service is a Unified Messaging Service.

12. The computing system of claim 10, wherein automatically reconfiguring the existing speed dial directed to the single voice messaging system comprises reconfiguring the existing speed dial on a user mobile device directed to the single voice messaging system to use to an access phone number received from the first voice messaging service.

13. The computing system of claim 12, wherein a client application on the user mobile device automatically reconfigures the redirected missed phone calls for retrieval of voice mail messages from the first voice messaging service.

14. The computing system of claim 13, wherein the automatic reconfiguration occurs between the client application and a mobile operator of the client application.

15. The computing system of claim 10, wherein the indication to revert missed phone calls made to the first phone number to the first voice messaging service is received from a user.

16. The computing system of claim 10, wherein the indication to revert missed phone calls made to the first phone number to the first voice messaging service is based on changed conditions.

17. The computing system of claim 10, wherein the first voice mail service is provided by a mobile operator.

18. The computing system of claim 10, wherein the computer-readable instructions further cause the computing system to:
    automatically revert to original voice mail settings on a mobile device of the user.

19. A computer storage device encoding computer executable instructions for performing a method of using a single voice messaging service for handling voice mail messages directed to at least two different voice messaging systems of a user, the method comprising:
    receiving an indication to automatically configure the single voice messaging service for handling voice mail messages directed to a first voice messaging system and a second voice messaging system of the user;
    automatically redirecting missed phone calls from the first messaging system associated with a first phone number to the single voice messaging service for retrieval of voice mail messages;
    automatically redirecting missed phone calls from the second messaging system associated with a second phone number to the single voice messaging service for retrieval of voice mail messages; and
    automatically modifying an existing speed dial directed to the first voice messaging system to be redirected to the single voice messaging service.

20. The computer storage device of claim 19, wherein automatically reconfiguring the existing speed dial associated with the first voice messaging system further comprises reconfiguring the existing speed dial on a user mobile device associated with the first voice messaging system to use an access phone number received from the single voice messaging service.

* * * * *